United States Patent [19]

Lescaut

[11] Patent Number: 4,611,833
[45] Date of Patent: Sep. 16, 1986

[54] PIPE JOINTS AND PROCESS FOR THEIR PRODUCTION

[75] Inventor: Pierre L. Lescaut, Bernay, France
[73] Assignee: Atochem, France
[21] Appl. No.: 732,847
[22] Filed: May 10, 1985

[30] Foreign Application Priority Data

May 24, 1984 [FR] France ............................ 84 08152

[51] Int. Cl.$^4$ ............................................. F16L 13/02
[52] U.S. Cl. ........................................ 285/55; 285/286; 29/458
[58] Field of Search ..................... 285/55, 286, 329; 29/458

[56] References Cited

U.S. PATENT DOCUMENTS

| | | | |
|---|---|---|---|
| 2,372,712 | 4/1945 | Crawford | 285/55 |
| 3,325,191 | 6/1967 | Yates | 285/286 X |
| 3,541,670 | 11/1970 | McCrory, Jr. | 285/55 X |
| 3,965,555 | 6/1976 | Webster et al. | 285/55 X |
| 4,357,745 | 11/1982 | Chlebowski | 285/55 X |
| 4,366,971 | 1/1983 | Lula | 285/55 |

FOREIGN PATENT DOCUMENTS 660158 5/1938 Fed. Rep. of Germany ........ 285/55
372403 3/1973 U.S.S.R. .............................. 285/286

Primary Examiner—Thomas F. Callaghan
Attorney, Agent, or Firm—Brooks Haidt Haffner & Delahunty

[57] ABSTRACT

Pipelines internally coated with heat sensitive materials to protect the pipe from corrosion and/or abrasion, the edges of the pipe sections and the interiors of the pipe sections being coated with stainless metal alloy for a distance from one-half to three pipe diameters from the edge of the pipe, the interior of the pipe being coated with the heat sensitive material except for a reserved zone of the interior measuring from one to two diameters from the edge of the section and the heat sensitive material covering about 20 millimeters of the stainless alloy coating, the pipes being joined by a first weld of the stainless alloy and an outer weld of the pipe metal, together with methods for the preparation of such pipelines.

12 Claims, 1 Drawing Figure

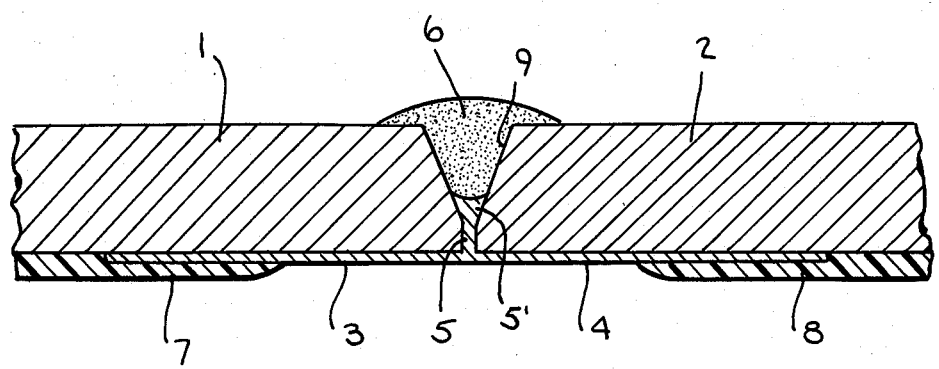

PIPE JOINTS AND PROCESS FOR THEIR PRODUCTION

BACKGROUND OF THE INVENTION

The present invention relates to novel pipe joints, and more particularly, it relates to autogenous welding of large diameter pipes and to the piping so produced.

The pipes or tubes contemplated according to the present invention are typified by pipelines having a 200 mm or greater diameter. These pipes are presently prepared in lengths of six to 15 meters and are provided with anti-corrosion interior coatings or anti-abrasion coatings, depending upon the fluid to be carried. As contemplated herein, fluids is used in the most general sense to include petroleum liquids, water, chemical and alkaline solutions, aqueous suspensions of solids, such as coal particles, slurries, and the like.

Pipes used to transport such fluids are usually provided with interior protection which can be, according to the use and degree of evolution of the technique, of centrifugal cement, bitumens, polyurethane coatings, and cold-hardened catalyzed epoxy resin coatings.

With all such coatings, because of, respectively, their tendency to crack, their fusibility, and their tendency to pyrolyze at the welding temperature for the pipes, there has been a need to keep at the ends of the pipes an uncoated band which can vary from about one-half to about two pipe diameters depending on the pipe size, the wall thickness of the pipe, and the type of coating.

These uncoated portions are then the site of heavy local corrosion, requiring the costly replacement of the piping over greater or lesser periods of time.

Some of the solutions call for metal flanges faced with elastomeric material which rest on the interior coating, which is utilized in such cases without an uncoated zone at the ends of the pipe sections. The drawback of such solution is that they do not resist high pressure and can be used only at lower pressures below 35 bars.

Another solution involves utilizing stainless steel connecting sleeves. It is a solution which is always costly and can at the same time lead to complications when the interior coating of the tube is thick where a special abrasion resistance is sought.

Methods have been described in certain prior art patents. U.K. Patent No. 401,615 shows a double conical ring fitted with a positioning rib, which centers the ends of the pipes to be joined. French Pat. No. 992,388 inserts a grooved ring with clearance into each end of the pipe. The exterior edge of the ring forms a ridge to permit welding to the end of the pipe. Thus, a shoulder piece according to the coating thickness must be contemplated, and a tight joint is, in such case, critical.

THE INVENTION

The present invention overcomes the problems of the prior art very simply. It contemplates a first fabrication step carried out in the workshop. The pipes are provided at each end, for a length measured from the edge between a half and three times the diameter, with a coating applied with an oxyacetylene torch, according to the Schoop process, of a stainless metal alloy of iron and chrome, nickel, or cobalt, which can also be alloyed with tungsten carbide. This alloy is generally used in the powdered state and it is equally sprayed on the end portions of the inner pipe wall. The thickness of the alloy deposited varies according to the particular use and is from 200 to 600 microns.

BRIEF DESCRIPTION OF THE DRAWING

The invention is further described by reference to the accompanying FIGURE which is a cross section of one wall of the pipe joint.

DESCRIPTION OF THE PREFERRED EMBODIMENT

As part of this first step carried out in the shop, a coating is deposited on almost the entire length of the internal pipe. This coating is a thermoplastic resin which is one or more polyamides, fluorinated resins, polyethylenes, or polyvinyl chloride (PVC).

These resins are advantageously used in the form of fine powders with a particle size of from 10 to 400 microns. They are applied by known processes, such as electrostatic deposition of powdered resins, by direct dipping or, for large diameter pipes, by rotary casting.

A portion with a length from one-half to two times the diameter of the pipes to be joined is reserved at each end of the pipe to protect the heat sensitive coating from melting or from pyrolysis occurring through the temperature elevation during the autogenous welding, which is carried out in the second step in the field, where the pipe sections are assembled.

In the same way, some other types of known heat sensitive coatings can be used as an interior coating in carrying out the process of this invention. Thus, thermosetting resins such as polyurethanes or cold-set catalyzed epoxy resins can be used, as can thermoplastic coatings such as bitumens or cements. In the case of these latter materials, the coating thickness varies from 200 microns to five millimeters.

The clear zone at each end of the pipe sections along the length coated with the initially deposited stainless metal alloy must be such that the heat sensitive coating always covers the stainless metallic deposit so as to assure continuous protection of the interior pipe wall.

The zone covered must not be less than 20 mm measured in the direction of the pipe generatrices safely to obtain a continuous protective coating.

The relationship of the protective layers for the pipe can be better understood by reference to the FIGURE which represents in axial section two lengths of pipe in the region of the welded joint. Only one half of the pipe cross section is represented, namely, the half situated above the pipe axis. Thus, the upper part of the FIGURE shows the pipe's exterior, and the lower part of the FIGURE, the pipe's interior.

The interior wall of pipe 1 and the interior wall of the second pipe 2, respectively, of the connected sections have the preliminary stainless metal coatings 3 and 4 on each connected pipe. Edge 5 between the ends of pipes 1 and 2 has also been sprayed with stainless metal by an oxyacetylene gun. Coatings 7 and 8 of the thermosensitive composition respectively cover part of each of the two pipes 1 and 2.

The pipe sections are chamfered as shown at 9 so the resulting bed formed by the chamfers is filled with stainless metal 5' furnished by a first fillet of alloy having a composition identical to that of the coating applied in the first step. Thus, the stainless coatings of the two ends of the pipes are joined together.

The remainder of chamfer 9 is filled with metal 6, the same metal as that of the pipe, by fusion as a second supporting fillet.

Unless otherwise stated, all parts, percentages, proportions and ratios herein are by weight.

The following Example is given to illustrate embodiments of the invention as it is presently preferred to practice it. It will be understood that this Example is illustrative, and the invention is not to be considered as restricted thereto except as indicated in the appended claims.

EXAMPLE

A stainless ferrochromium alloy with a thickness of 500 microns is applied to the interior wall and edge of a 200 mm diameter pipe over a length of 120 mm measured from the end of the pipe. Thereafter, a coating of polyamide-11 is deposited electrostatically to attain a thickness of 600 microns, leaving an uncoated reserve zone of 80 mm from the end of the pipe section.

Thereafter, the pipe sections are joined in the field in the second step by fusion of the ferrochromium alloy support layer to weld the two edges which were provided with an alloy coating in the preceding step, followed by one or more added fillets from a steel rod to obtain a strong conventional weld.

The resistance of the joint to corrosion is tested by cutting into the pipe sections to obtain a 0.50 meter length held together by a joint according according to this invention. By mounting this coupling between two plates fitted with liquid tight couplings, a cylindrical capacity of 15.70 liters is obtained which, after boring appropriate orifices, is filled with a 4 percent sodium chloride brine which is circulated continuously at the rate of 700 liters a minute between the test volume and a vat through the use of a feed pump.

No corrosion is found after a test of 150 hours with brine at a temperature of 40° C.

It will be appreciated from the foregoing description that the present invention is useful in assembling sections of metallic pipes, tubing, and conduits of all kinds.

What is claimed is:

1. A pipeline internally coated with heat sensitive material to protect the interior of the pipe from corrosion or abrasion and comprising at least two pipe sections connected by a welded joint, wherein the interior of each metal pipe is coated with a stainless metal alloy for a distance of from one-half to three pipe diameters from the end of the pipe and there is a reserved zone at the end of the pipe which reserved zone is free of the heat sensitive material which otherwise covers the interior wall of the pipe, the heat sensitive coating overlapping the stainless metal alloy coating for at least about 20 millimeters from the end of the pipe, the edge of each section being coated with the stainless alloy and constituting the welded joint between the two pipe sections, the pipe sections being joined together by the bond formed by stainless alloy with the edges of the pipe and further bonded by an outer weld of metal which is of substantially the same metal as the metal comprising the pipe.

2. A pipeline according to claim 1 wherein the stainless alloy is a corrosion-resistant alloy of chrome, nickel, and/or cobalt with iron.

3. A pipeline according to claim 1 wherein the stainless alloy is abrasion-resistant and is an alloy of nickel with tungsten carbide and with iron.

4. A pipeline according to claim 1 wherein the heat sensitive coating is a thermoplastic resin which is polyamide, fluorinated resin, polyethylene, or polyvinyl chloride.

5. A pipeline according to claim 1 wherein the heat sensitive coating is a thermosetting polyurethane resin.

6. A pipeline according to claim 1 wherein the heat sensitive coating is a catalyzed cold set epoxy resin.

7. A pipeline according to claim 1 wherein the heat sensitive coating is a bitumen.

8. A pipeline according to claim 1 wherein the heat sensitive coating is a cement.

9. A method for fabricating pipe joints which comprises coating a portion of the interior end of a pipe and the edge of the pipe with a stainless metal alloy for a distance of from one-half to three pipe diameters from the end of the pipe; covering the interior of the pipe with a heat sensitive coating for the entire length of the pipe except for a reserved zone at each end of the pipe, the length of the reserved zone being from one to two pipe diameters and the heat sensitive coating covering the stainless metal coating for a distance of at least about 20 millimeters; welding the end of the pipe to the end of a second pipe similarly prepared with a stainless metal alloy having substantially the same composition as that of the alloy used to coat the portion of the interior of the pipe; and finally welding the pipes with substantially the same metal as that comprising the pipes.

10. A method according to claim 9 wherein the alloy is of iron and of chromium, nickel, or cobalt.

11. A method according to claim 10 wherein the alloy also contains tungsten carbide.

12. A method according to claim 9 wherein the heat sensitive material is polyamide, fluorinated resin, polyethylene, or polyvinyl chloride thermoplastic; polyurethane; catalyzed cold-set epoxy resin; bitumen; or cement.

* * * * *